United States Patent
Walsh et al.

(10) Patent No.: US 8,947,844 B2
(45) Date of Patent: Feb. 3, 2015

(54) SERIES TYPE SURGE SUPPRESSOR AND CLAMPING CIRCUIT

(71) Applicant: Middle Atlantic Products, Inc., Fairfield, NJ (US)

(72) Inventors: Brendan Kyle Walsh, Belvidere, NJ (US); Walter Corter, Jefferson, NJ (US)

(73) Assignee: Middle Alantic Products, Inc., Fairfield, NJ (US)

( * ) Notice: Subject to any disclaimer, the term of this patent is extended or adjusted under 35 U.S.C. 154(b) by 84 days.

(21) Appl. No.: 13/673,526

(22) Filed: Nov. 9, 2012

(65) Prior Publication Data

US 2013/0301174 A1 Nov. 14, 2013

Related U.S. Application Data

(60) Provisional application No. 61/646,613, filed on May 14, 2012, provisional application No. 61/654,610, filed on Jun. 1, 2012.

(51) Int. Cl.
| | |
|---|---|
| *H01C 7/12* | (2006.01) |
| *H02H 1/00* | (2006.01) |
| *H02H 1/04* | (2006.01) |
| *H02H 3/22* | (2006.01) |
| *H02H 9/06* | (2006.01) |
| *H02H 9/00* | (2006.01) |

(52) U.S. Cl.
USPC .............................. 361/118; 361/56; 361/111

(58) Field of Classification Search
CPC ........... H02H 9/00; H02H 9/02; H02H 9/021; H02H 9/04; H02H 9/042; H02J 3/1864
USPC .............................. 361/56, 58, 111, 117, 118
See application file for complete search history.

(56) References Cited

U.S. PATENT DOCUMENTS

| | | | | |
|---|---|---|---|---|
| 4,288,830 | A * | 9/1981 | Brasfield ......................... | 361/56 |
| 4,862,307 | A | 8/1989 | Larson et al. | |
| 4,870,534 | A | 9/1989 | Harford | |
| 5,436,786 | A * | 7/1995 | Pelly et al. ...................... | 361/56 |
| 5,751,530 | A * | 5/1998 | Pelly et al. ...................... | 361/56 |
| 5,856,904 | A * | 1/1999 | Pelly et al. ..................... | 361/111 |
| 5,907,234 | A * | 5/1999 | Sadek et al. .................. | 323/210 |
| 6,226,166 | B1 * | 5/2001 | Gumley et al. ............... | 361/118 |
| 6,728,089 | B2 | 4/2004 | Harford | |
| 7,068,487 | B2 | 6/2006 | Harford | |
| 7,738,222 | B2 * | 6/2010 | Deutschmann et al. ........ | 361/56 |
| 7,940,029 | B2 * | 5/2011 | Johnson ........................ | 323/207 |
| 2003/0063425 | A1 * | 4/2003 | Smith et al. ................... | 361/139 |
| 2010/0109616 | A1 * | 5/2010 | Li et al. ......................... | 323/210 |
| 2012/0169301 | A1 * | 7/2012 | Johnson ........................ | 323/210 |

* cited by examiner

Primary Examiner — Rexford Barnie
Assistant Examiner — Christopher Clark
(74) Attorney, Agent, or Firm — Drinker Biddle & Reath LLP (57) ABSTRACT

Various embodiments relate to a degrade-resistant surge suppressor that detects and suppresses surge events. The surge suppressor includes a high impedance high pass filter, one or more series inductors, and one or more capacitor banks. The capacitor bank may include a bridge rectifier circuit having two diodes and two SCRs (Silicon-Controlled Rectifiers), or a diode bridge rectifier fed by a TRIAC (Node for Alternating Current). The surge suppressor may further include a secondary trigger device to ensure proper attenuation of surge events.

22 Claims, 5 Drawing Sheets

SERIES TYPE SURGE SUPPRESSOR AND CLAMPING CIRCUIT

RELATED APPLICATION

This application is related to and claims priority from U.S. Provisional Application No. 61/646,613 filed May 14, 2012 and U.S. Provisional Application No. 61/654,610 filed Jun. 1, 2012, the disclosures of which are incorporated herein by reference in their entirety.

BACKGROUND

Various embodiments disclosed herein relate to devices that suppress transient voltage events which could potentially damage sensitive connected equipment and more specifically to a non-degrading surge suppressor and method for detecting and suppressing surge events.

A conventional series mode device for suppressing transient voltage events typically uses an L-C (inductor-capacitor) filter, where the capacitor is located within a bridge rectifier circuit and thereby prevents charge from being transferred back to the line once the charge has been stored in the capacitor. The conventional device performs surge detection after the initial inductor of the L-C filter and after the bridge rectifier. Specifically, the conventional device detects a surge event by monitoring the charge of a single capacitor within the bridge rectifier circuit. The capacitor is held charged to the peak level of the incoming AC (Alternating Current) line voltage, and when a surge event occurs, additional discharged capacitors are switched into the circuit.

Conventional methods for surge detection rely on the detection of a surge event after the series inductor of an L-C filter. Due to the nature of L-C filters, a conventional device does not detect or suppress surges until after the voltage at the output line has already begun to rise, which could potentially damage any equipment connected to the output line. Additionally, a capacitor within the bridge rectifier circuit is kept charged to the peak level of the incoming AC line. Because capacitor lifespan is dependent on a working voltage of the capacitor, a higher working voltage equates to a shorter lifespan. Since the capacitor in a conventional device is always held near the peak level of the line voltage, special attention must be paid to the rated working voltage of the capacitor to mitigate the possibility of a long duration voltage swell. For example, for a 120VAC circuit in the United States, the capacitor would be held at a nominal voltage of about 170VDC during normal operation. One of ordinary skill in the art could surmise from best practices that a capacitor with a working voltage of 250VDC could be used. However, in the event of a swell in voltage, for example, 200VAC, the voltage across the capacitor would rise to about 283VDC, well above the rated working voltage of the capacitor. To protect the conventional surge suppressing device during high voltage swells, the conventional device typically employs a crowbar circuit before the L-C filter where the incoming line is disconnected from the capacitor in the bridge rectifier circuit until the voltage swell has passed or manually reset by an operator.

SUMMARY

Various embodiments of the invention disclosed herein overcome problems of known surge suppressing devices by limiting the output line voltage, increasing the lifespan of capacitors, and negating the need of a crowbar circuit to protect the surge suppressing devices.

In an embodiment, a degrade-resistant surge suppressor detects and suppresses surge events through the use of a high impedance high pass filter, one or more series inductors, and one or more capacitor banks. The capacitor bank may include a bridge rectifier circuit having two diodes and two SCRs (Silicon-Controlled Rectifiers), or a diode bridge rectifier fed by a TRIAC (Triode for Alternating Current) or other similar devices known in the art. The surge suppressor may further include a secondary trigger device to ensure proper attenuation of surge events.

By placing a high impedance filter network before the series inductor, the surge suppressor detects a surge event before the output line voltage begins to rise. This configuration allows the capacitor bank to be switched on sooner than conventional surge suppressing devices, thus limiting the output voltage to any equipment connected to the surge suppressor.

Since the capacitors within the capacitor bank are kept discharged or minimally charged from leakage currents present in the high pass filter network, the lifespan of the capacitors may be increased. For example, a 250V, 1000 hour at 85° C. capacitor used in conventional surge suppressing devices would have an expected lifespan of about 10.8 years at an operating temperature of 25° C. The same capacitor used in the embodiments disclosed herein would have an expected lifespan of about 60.9 years, a six-fold improvement in lifespan.

Because the capacitor bank is only switched on during a high frequency surge event, damage to the capacitor bank during a long duration voltage swell becomes a non-issue, negating the need for a crowbar circuit before the series inductor to protect the surge suppressor. However, a crowbar circuit may still be used after the output line of the surge suppressor for additional protection of any connected equipment.

While the exemplary embodiments described herein are presented in the context of a series type surge suppressor and clamping circuit, these embodiments are exemplary only and are not to be considered limiting.

BRIEF DESCRIPTION OF THE DRAWINGS

Various embodiments are illustrated in the drawings and following discussion.

DETAILED DESCRIPTION

As described herein, a non-degrading surge suppressor may detect and suppress voltage surge events through the use of a high impedance high pass filter, one or more series inductors, and one or more capacitor banks. The capacitor bank may include a bridge rectifier circuit having two diodes and two SCRs (Silicon-Controlled Rectifiers), or a diode bridge rectifier fed by a TRIAC (Triode for Alternating Current) or other similar devices known in the art.

Figure 1:
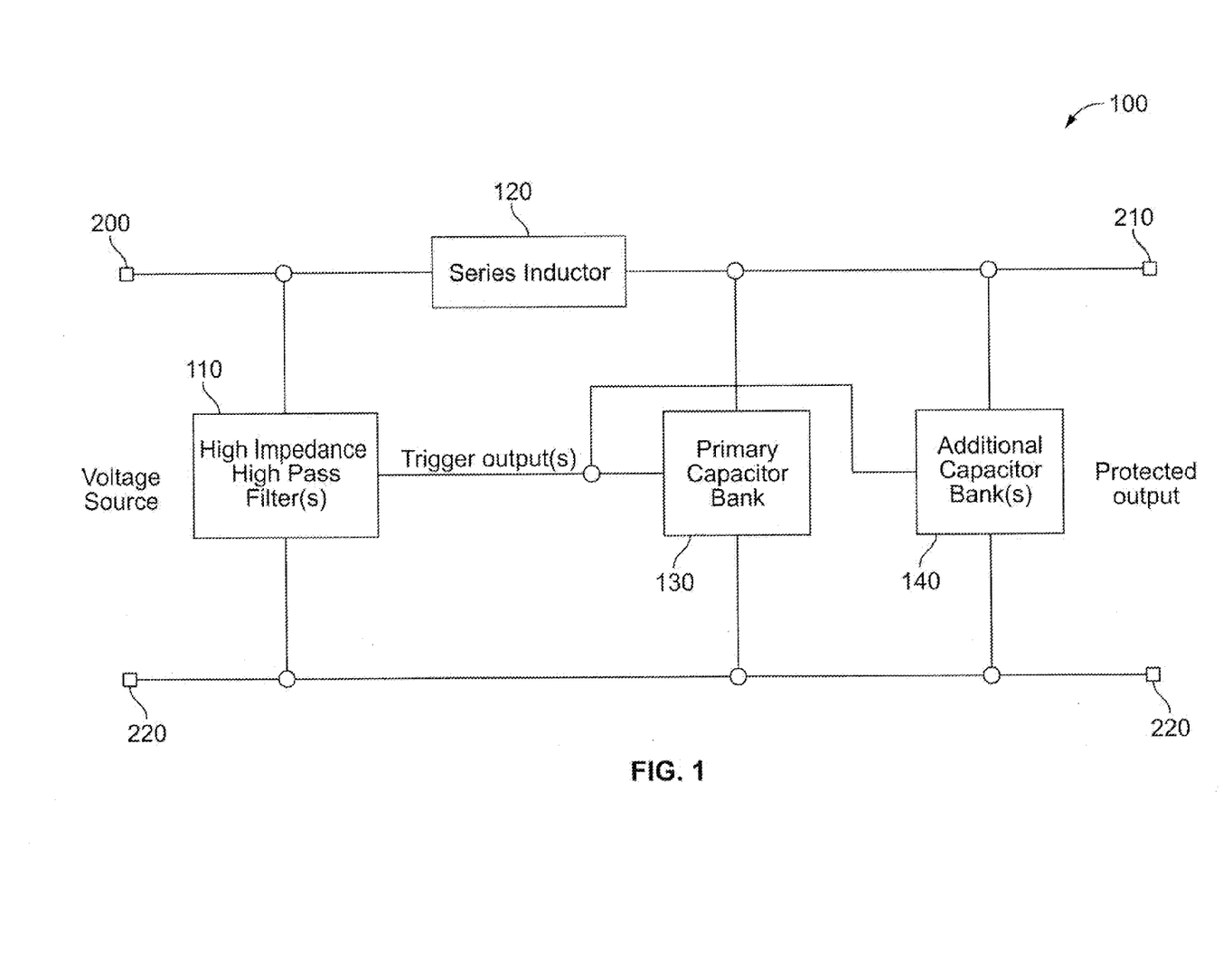
FIG. 1 is a block diagram illustrating a surge suppressor, according to an embodiment.

FIG. 1 is a block diagram illustrating a surge suppressor 100, according to an embodiment. Surge suppressor 100 includes a high impedance high pass filter 110, a series inductor 120, and a primary capacitor bank 130. The surge suppressor 100 may further include additional capacitor banks 140 and additional high impedance high pass filters. The input line 200 is fed into the high pass filter 110 and series inductor 120. The output of the inductor 120 is connected to the primary capacitor bank 130 so that the primary capacitor bank 130 and the inductor 120 are in series. The output of the high pass filter 110 serves as a trigger for the primary capacitor bank 130 and any additional capacitor banks 140. The high pass filter 110 and capacitor banks 130 and 140 are grounded at a neutral line 220. A voltage from a voltage source, for example, an AC voltage source, enters the surge suppressor 100 at the input line 200 and exits the surge suppressor 100 at the protected output line 210 to power any connected equipment.

By placing the high impedance high pass filter 110 ahead of the series inductor 120, the surge suppressor 100 detects a surge event before the output voltage at the output line 210 begins rise. This configuration allows the capacitor bank 130 to be switched on sooner than conventional devices, thus limiting the output voltage of the surge suppressor 100.

Since all the capacitors in the capacitor bank 130 are kept discharged or minimally charged from leakage currents present in the high pass filter 110, the lifespan of the capacitors may be increased. For example, a 250V, 1000 hour at 85° C. capacitor used in conventional surge suppressing devices would have an expected lifespan of about 10.8 years at an operating temperature of 25° C. The same capacitor used in the embodiments disclosed herein would have an expected lifespan of about 60.9 years, a six-fold improvement in lifespan.

Since the capacitor bank 130 is only switched on during a high frequency surge event, damage to the capacitor bank 130 during a long duration voltage swell becomes a non-issue, negating the need for a crowbar circuit to protect conventional surge suppression devices. However, a crowbar circuit may still be used after the output line of the surge suppressor 100 for additional protection of any connected equipment.

Figure 2A:
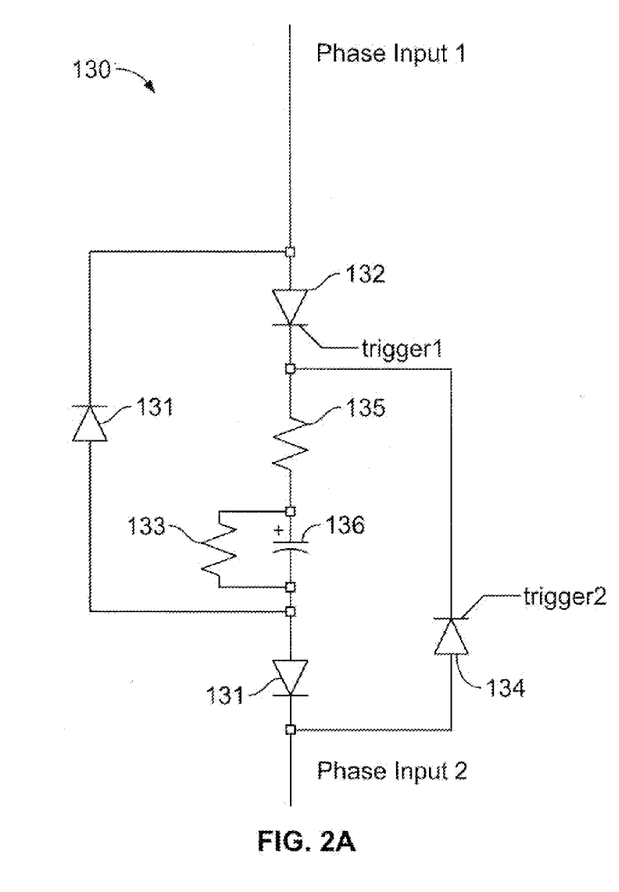
FIGS. 2A and 2B are circuit diagrams illustrating capacitor banks of the surge suppressor of FIG. 1.

FIGS. 2A and 2B are circuit diagrams illustrating capacitor bank 130 of the surge suppressor 100 of FIG. 1. FIG. 2A illustrates a capacitor bank 130 including two diodes 131 and two SCRs 132 and 134. As shown in FIG. 2A, SCRs 132 and 134 replace two of the four diodes in a diode bridge rectifier. Capacitor 136 is connected to the DC (Direct Current) output of the bridge rectifier circuit formed by diodes 131 and SCRs 132 and 134. Resistor 133 is in parallel with capacitor 136 so that when capacitor 136 is fully charged, current only flows through resistor 133. Resistor 135 is connected in series with resistor 133 and capacitor 136 and serves as a current limiting resistor. Phase Input 1 is connected to the output of the series inductor 120 (as shown in FIG. 1), and Phase input 2 is connected to the neutral line 220 (as shown in FIG. 1). SCR 132 has a gate trigger1 and SCR 134 has a gate trigger2, where the triggers are connected to the output of the high pass filter 110 (as shown in FIG. 1). SCRs 132 and 134 operate as electronic switches for capacitor 136 and will only switch on when voltages across trigger1 and trigger2 have reached a threshold level. While the capacitor bank 130 is shown with only capacitor 136 in the present embodiment, the capacitor bank 130 may include additional capacitors.

Figure 2B:
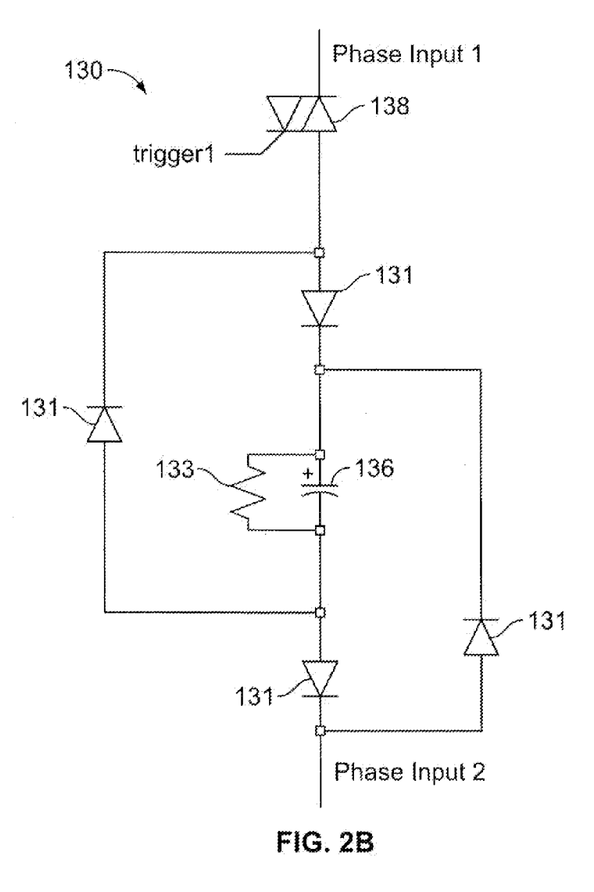

FIG. 2B illustrates an alternate capacitor bank 130 including a TRIAC 138 that is fed into a diode bridge rectifier. As shown in FIG. 2B, TRIAC 138 is connected to the input of a bridge rectifier formed by four diodes 131. Capacitor 136 is connected to the DC output of the bridge rectifier and is in parallel with resistor 133. When capacitor 136 is fully charged, current only flows through resistor 133. Phase Input 1 is connected to the output of the series inductor 120 (as shown in FIG. 1), and Phase Input 2 is connected to the neutral line 220 as shown in FIG. 1). The TRIAC 138 has a gate trigger1, which is connected to the output of the high pass filter 110 (as shown in FIG. 1). TRIAC 138 operates as an electronic switch for capacitor 136 and will only allow current to flow to capacitor 136 when a voltage across trigger1 has reached a threshold level. Furthermore, it is well known in the art that a TRIAC may be replaced by back-to-back SCRs, where the outputs of the SCRs are connected together. While the capacitor bank 130 is shown with only capacitor 136 in the present embodiment, the capacitor bank 130 may include additional capacitors.

Figure 3:
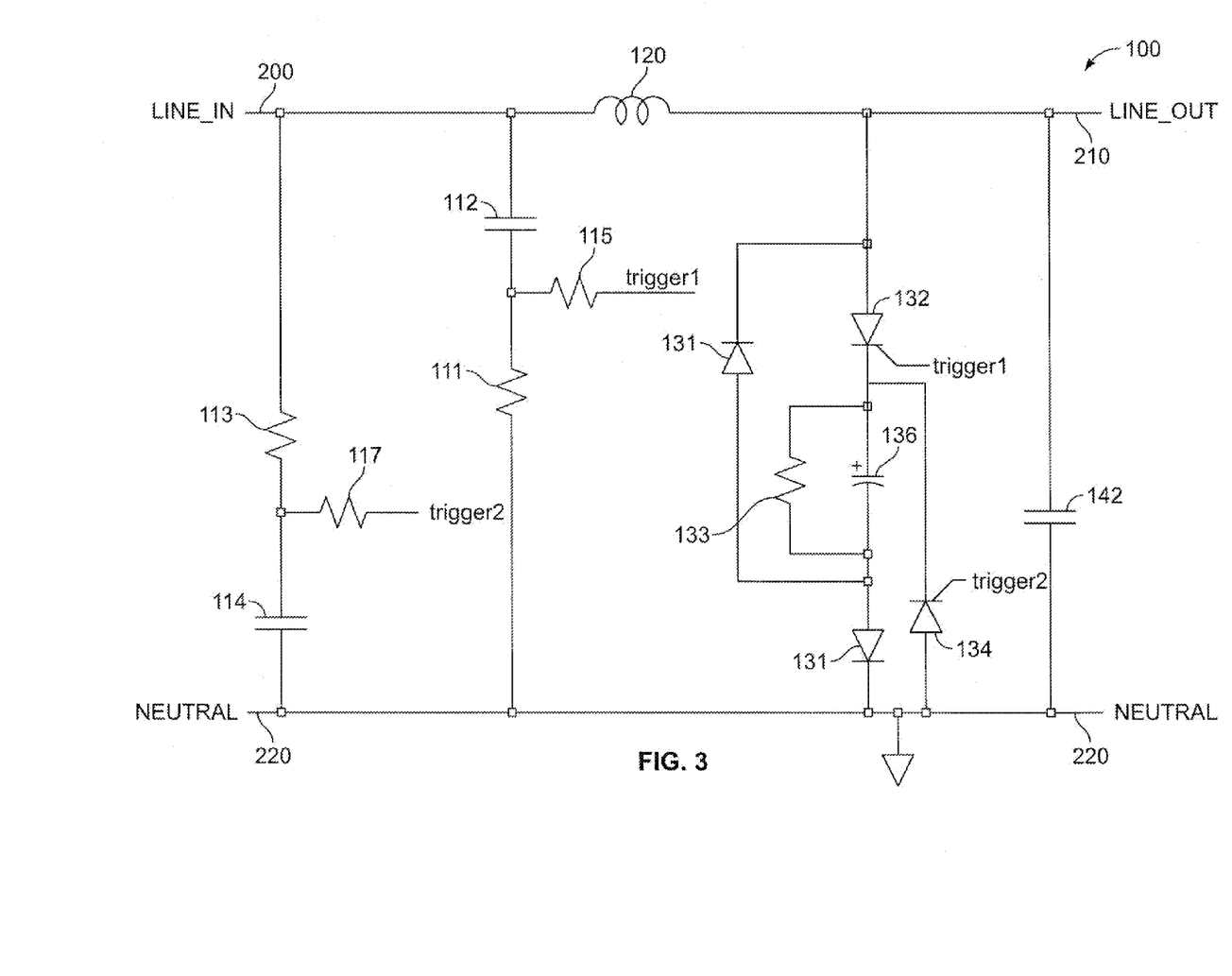
FIG. 3 is a circuit diagram illustrating a surge suppressor having two SCRs, according to an embodiment.

FIG. 3 is a circuit diagram illustrating an alternate surge suppressor 100 having two SCRs 132 and 134, according to an embodiment As shown in FIG. 3, surge suppressor 100 includes two R-C (resistor-capacitor) high pass filters 110 (as shown in FIG. 1) 110A/110 B, a series inductor 120, a capacitor bank 130 (as shown in FIG. 2A) including two SCRs 132 and 134, and an additional capacitor 142. The first high pass filter includes capacitor 112 connected line-in 200 in series with resistor 111 connected to neutral 220 A. current limiting resistor 115 is located at the output of the first high pass filter. The second high pass filter includes capacitor 114 connected to neutral 220 in series with resistor 113 connected to line-in 200. A current limiting resistor 117 is located at the output of the second high pass filter. The capacitor hank 130 includes a bridge rectifier formed by two SCRs 132 and 134 and two diodes 131, and capacitor 136 in parallel with resistor 133 connected to the DC output of the bridge rectifier in the capacitor bank 130. The output of the first high pass filter activates trigger1 of SCR 132 in the capacitor bank 130. The output of the second high pass filter activates trigger2 of SCR 134 in the capacitor bank 130. Voltage enters the surge suppressor 100 at input line 200 and exits the surge suppressor 100 at output line 210, The surge suppressor 100 is grounded at neutral line 220.

During normal operation of the surge suppressor 100, low frequency voltages are rejected by the first and second high pass filters, keeping the voltage across the triggers of SCRs 132 and 134 in the capacitor bank 130 below a threshold level. In other words, SCRs 132 and 134 act as electronic switches that control the flow of current to capacitor 136, where SCRs 132 and 134 are switched off when there is no high frequency voltage surge. The high pass filters 110 thus keep capacitor 136 discharged, or only minimally charged due to normal leakage currents.

When a high frequency voltage surge is present at the input line 200 of the surge suppressor 100, the surge is passed through the first and second high pass filters allowing the trigger voltages to SCRs 132 and 134 to rise, thus switching SCRs 132 and 134 into the circuit. SCRs 132 and 134 in turn allow current to flow to capacitor 136 and switch capacitor 136 into the circuit. Due to the series inductance by the series inductor 120, there is a delay between the surge at the input line 200 and a rise in output voltage at the output line 210. Because capacitor 136 is kept discharged during normal operation, capacitor 136 has ample capacitance available to absorb the energy of the surge event. The output voltage at the output line 210 is thus kept below a level that could potentially damage any equipment connected to the surge suppressor 100.

Figure 4:
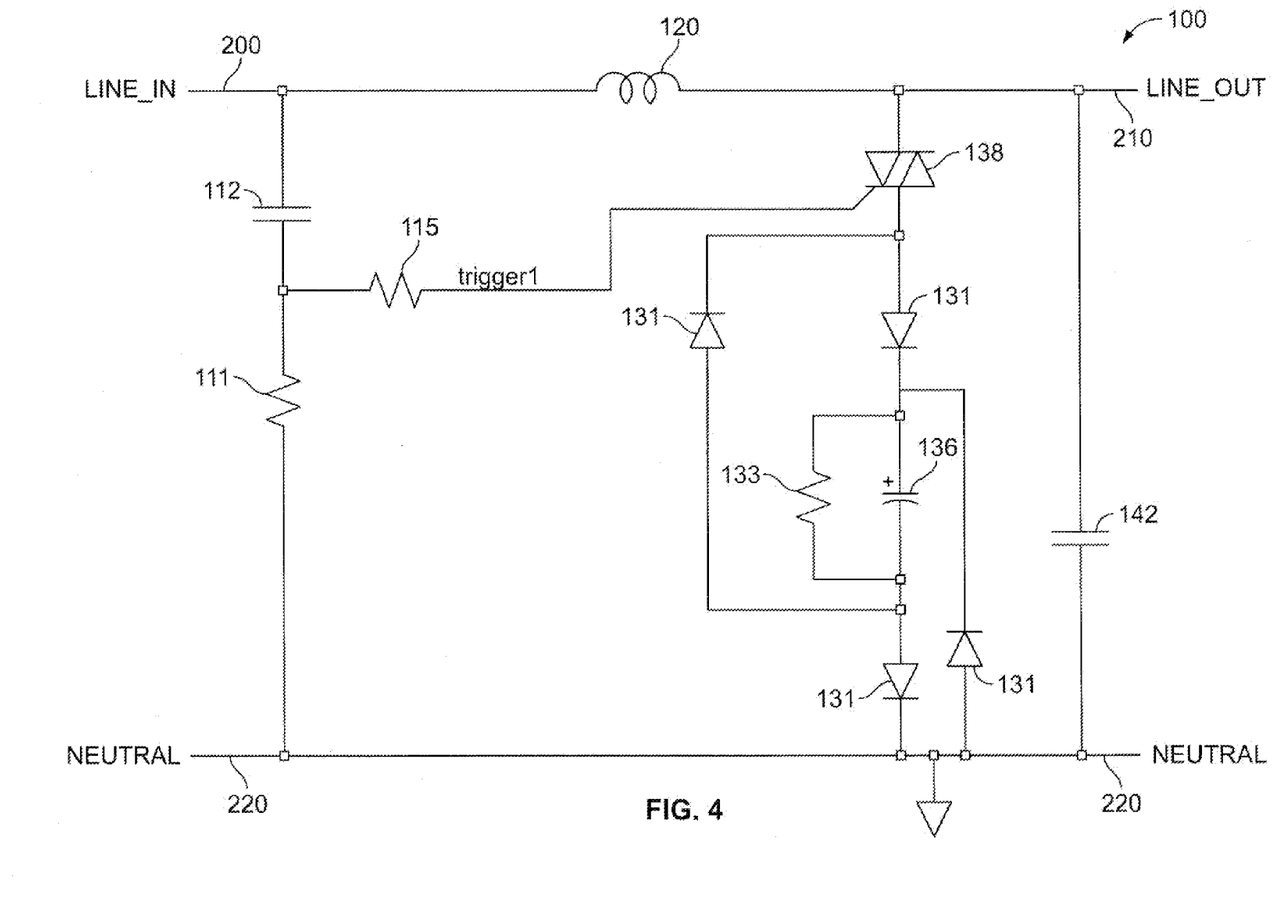
FIG. 4 is a circuit diagram illustrating a surge suppressor having a TRIAC, according to an embodiment.

FIG. 4 is a circuit diagram illustrating a surge suppressor having a TRIAC 138, according to an embodiment as shown in FIG. 2B. As shown in FIG. 4, a surge suppressor 100 includes a RC high pass filter 110 (as shown in FIG. 1), a series inductor 120, a capacitor bank 130 (as shown in FIG. 2B) having the TRIAC 138 connected to the input of a diode bridge rectifier, and an additional capacitor 142. The high pass filter 110 includes resistor 111 in series with capacitor 112. A current limiting resistor 115 is located at the output of the high pass filter 110. The capacitor bank 130 includes the TRIAC 138 which feeds the bridge rectifier formed by four diodes 131. A capacitor 136 in parallel with resistor 133 is connected to the DC output of the bridge rectifier. Voltage enters the surge suppressor 100 at input line 200 and exits at output line 210. The surge suppressor 100 is grounded at neutral line 220. When capacitor 136 is fully charged, current only flows through resistor 133. The output of the high pass filter 110 activates trigger1 of TRIAC 138 in the capacitor bank 130.

During normal operation of the surge suppressor 100, low frequency voltages are rejected by the high pass filter 110, keeping the voltage across trigger1 of TRIAC 138 in the capacitor bank 130 below the threshold level. In other words. TRIAC 138 acts as an electronic switch that controls the flow of current to capacitor 136, where TRIAC 138 is switched off when there is no high frequency voltage surge. The high pass filter 110 thus keeps capacitor 136 discharged, or only minimally charged due to normal leakage currents.

When a high frequency surge is present at the input line 200 of the surge suppressor 100, the surge is passed through the high pass filter 110 allowing the trigger voltage to TRIAC 138 to rise, thus switching TRIAC 138 into the circuit. TRIAC 138 in turn allows current to flow to capacitor 136 and switches capacitor 136 into the circuit. Due to the series inductance by the series inductor 120, they is a delay between the surge at the input line 200 and the rise in output voltage at the output line 210. Because capacitor 136 is kept discharged during normal operation, capacitor 136 has ample capacitance available to absorb the energy of the surge event. The output voltage is thus kept below a level that could potentially damage any equipment connected at the output line 210 of the surge suppressor 100.

Under certain circumstances, such as a lower frequency impulse or secondary ringing from a primary surge event, capacitors used in a high pass filter (the primary trigger circuit for capacitor banks) of a surge suppressor may not pass sufficient current to activate the SCRs or TRIAC in the capacitor banks. Under such conditions, the surge suppressor may include a secondary trigger device to assure proper attenuation of the surge event.

Figure 5:
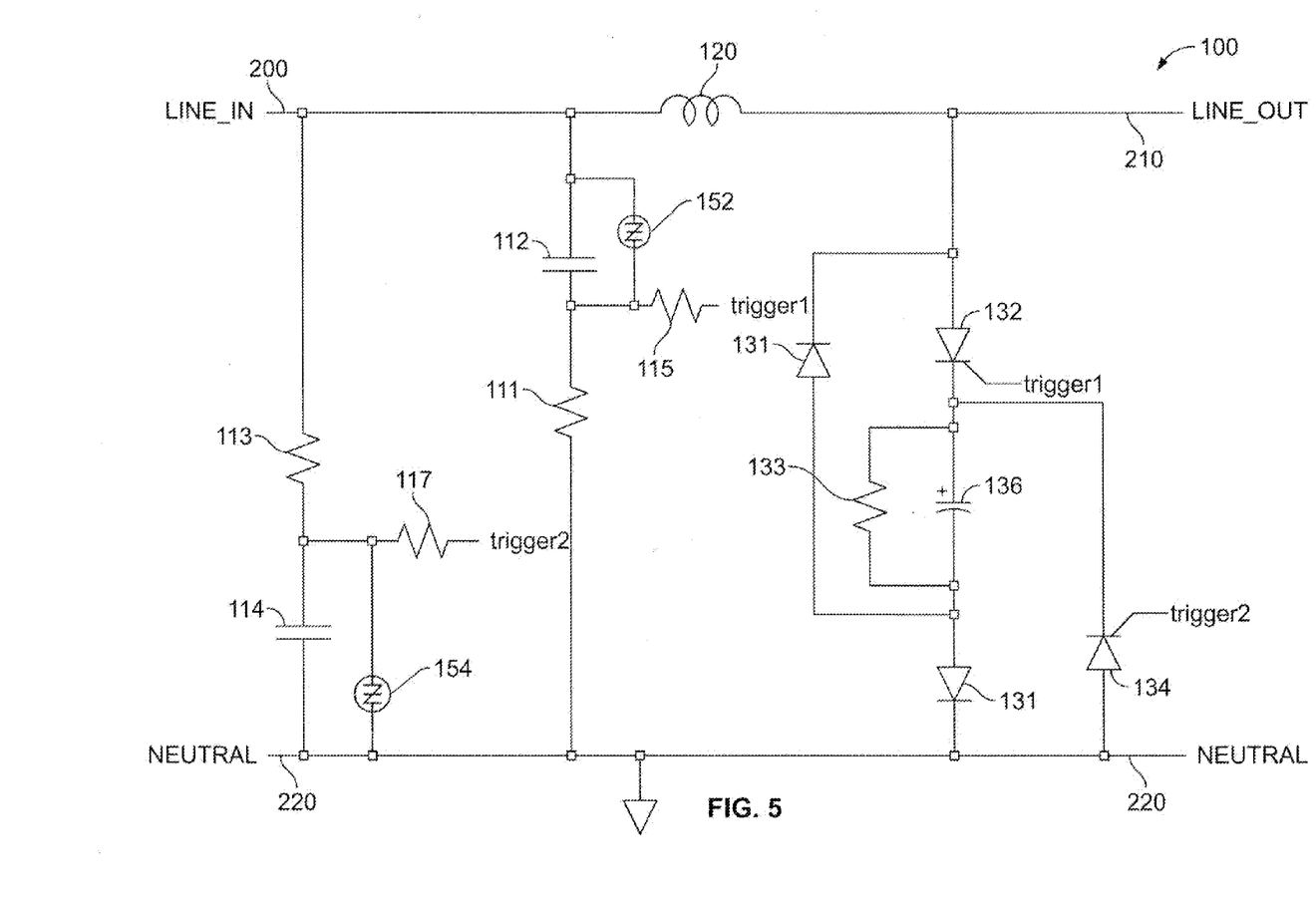
FIG. 5 is a circuit diagram illustrating a surge suppressor with secondary trigger devices, according to an embodiment.

FIG. 5 is a circuit diagram illustrating a surge suppressor 100 with secondary trigger devices 152 and 154, according to an embodiment. The surge suppressor 100 as shown FIG. 5 is similar to the surge suppressor as illustrated in FIG. 3, however, two SIDACs (Silicon Diode for Alternating Current) 152 and 154 as secondary trigger devices are added to the surge suppressor as shown in FIG. 3. SIDACs generally behave as voltage controlled switches and are commonly used in applications ranging from low voltage telecommunication circuit protection to high voltage switches for sodium lamp igniters. As illustrated in FIG. 5, SIDACs 152 and 154 are in parallel with capacitors 112 and 114 of the R-C high pass filters, respectively. Capacitors 112 and 114 operate as primary triggers for SCRs 132 and 134 of the capacitor bank 130 (as shown in FIG. 1 and FIG. 3), and SIDACs 152 and 154 serve as secondary triggers for SCRs 132 and 134, respectively.

During an overvoltage event or surge, current first begins to flow in the capacitors 112 and 114 in the high pass filters 110 of the surge suppressor 100. Capacitors 112 and 114 act as snubber capacitors for SIDACs 152 and 154, respectively, to limit the dV/dt (instantaneous rate of voltage change) across SIDACs 152 and 154. Once the voltage across capacitors 112 or 114 has reached a break-over voltage of SIDACs 152 or 154, respectively, SIDACs 152 or 154 begins conducting current. SIDACs 152 or 154 then respectively activate or trigger SCRs 132 or 134, allowing the surge current to flow into capacitor 136 in the capacitor bank 130.

The surge suppressor 100 having SIDACs 152 and 154 as secondary trigger devices offers several advantages. Because SIDACs are generally voltage dependent, even lower frequency surges will be clamped where trigger capacitors 112 and 114 may not pass enough current to trigger SCRs 132 and 134 in the capacitor bank 130. Since the break-over voltage of SIDACs is fairly consistent (for example, +/−15 V), the clamping level will be repeatable for a variety of waveforms. As silicon devices, SIDACs 152 and 154 may have indefinite lifespans, provided proper precautions are taken not to exceed component ratings. Furthermore, stress placed on capacitors 112 and 114 within the surge suppressor 100 is reduced since the primary path for the trigger current becomes the SIDACs 152 and 154 once the break-over voltage is reached. This configuration thus extends the practical lifespan of the capacitors and reduces the possibility of damage to the surge suppressor 100.

In other embodiments, a surge suppressor may also include a high pass filter to prevent unwanted triggering due to low energy noise. In another embodiment, alternate arrangements for the capacitor bank may provide better control of the initial charge level of the capacitors allowing for greater control of the final output voltage and charging current. In yet another embodiment, a crowbar circuit may be used after the surge device for additional protection of any connected equipment.

While the exemplary embodiments described herein are presented in the context of a series type surge suppressor and clamping circuit, these embodiments are exemplary only and are not to be considered limiting.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments, However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A surge suppressor comprising:
a high impedance high pass filter;
an inductor, wherein an input of the inductor is connected to an input AC line voltage source and an input of the high pass filter; and
a capacitor bank connected to an output of the inductor such that the inductor is in series with a combination circuit, the combination circuit comprising the capacitor bank connected in parallel with the external load circuit, and an output of the high pass filter is connected to a trigger of an electronic switch feeding the capacitor bank.

2. A surge suppressor comprising:
a high impedance high pass filter;
an inductor, wherein an input of the inductor is connected to an input of the high pass filter; and
a capacitor bank connected to an output of the inductor such that the inductor and the capacitor bank are in series, and an output of the high pass filter is connected to a trigger of an electronic switch feeding the capacitor bank;
wherein the capacitor bank comprises:
two Silicon-Controlled Rectifiers (SCRs) as the electronic switch feeding the capacitor bank, wherein gates of the SCRs are the trigger of the electronic switch;
two diodes, wherein the diodes and the SCRs are connected to form a first bridge rectifier; and
a first capacitor that is connected to a DC (Direct Current) output of the first bridge rectifier.

3. The surge suppressor of claim 2, wherein the first capacitor is maintained in a discharged state or a minimally charged state when high frequency voltage surges are not present.

4. The surge suppressor of claim 2, wherein the first capacitor that is connected to the DC output of the first bridge rectifier is connected in parallel with a resistor.

5. The surge suppressor of claim 2, further comprising a second capacitor, wherein the second capacitor is connected to the DC output of the first bridge rectifier, and the second capacitor is connected in parallel with the first capacitor.

6. The surge suppressor of claim 2, further comprising a second capacitor bank that is connected in parallel with the capacitor bank, wherein the second capacitor bank comprises:
a second bridge rectifier comprising two diodes connected to two SCRs, wherein the SCRs of the second bridge rectifier are an electronic switch feeding the second capacitor bank, and gates of the SCRs of the second bridge rectifier are a trigger of the electronic switch feeding the second capacitor bank; and
a second capacitor connected to a DC output of the second bridge rectifier.

7. A surge suppressor comprising:
a high impedance high pass filter;
an inductor, wherein an input of the inductor is connected to an input of the high pass filter; and
a capacitor bank connected to an output of the inductor such that the inductor and the capacitor bank are in series, and an output of the high pass filter is connected to a trigger of an electronic switch feeding the capacitor bank;
wherein the capacitor bank comprises:
a Triode for Alternating Current (TRIAC) as the electronic switch feeding the capacitor bank, wherein a gate of the TRIAC is the trigger of the electronic switch;
a first bridge rectifier comprising four diodes, wherein the TRIAC is connected to an input of the first bridge rectifier; and
a first capacitor that is connected to a DC (Direct Current) output of the first bridge rectifier.

8. The surge suppressor of claim 7, wherein the first capacitor is maintained in a discharged state or a minimally charged state when high frequency voltage surges are not present.

9. The surge suppressor of claim 7, wherein the first capacitor that is connected to the DC output of the first bridge rectifier is connected in parallel with a resistor.

10. The surge suppressor of claim 7, further comprising a second capacitor, wherein the second capacitor is connected to the DC output of the first bridge rectifier, and the second capacitor is connected in parallel with the first capacitor.

11. The surge suppressor of claim 7, further comprising:
a second bridge rectifier comprising four diodes, wherein the TRIAC is connected to an input of the second bridge rectifier, and the second bridge rectifier is connected in parallel with the first bridge rectifier; and
a second capacitor connected to a DC output of the second bridge rectifier.

12. The surge suppressor of claim 1, wherein the high pass filter comprises a resistor connected in series with a capacitor.

13. The surge suppressor of claim 12, further comprising a secondary trigger device that is connected in parallel with the capacitor of the high pass filter.

14. The surge suppressor of claim 13, wherein the secondary trigger device is a Silicon Diode for Alternating Current (SIDAC).

15. The surge suppressor of claim 1, further comprising an additional inductor that is connected from the output of the first inductor, the additional inductor being in series with the combination circuit.

16. The surge suppressor of claim 1, further comprising a crowbar circuit connected to an output of the surge suppressor across the external load circuit.

17. A surge suppressor comprising:
  a first high impedance high pass filter connected in parallel with a second high impedance high pass filter, wherein each high pass filter comprises a resistor connected in series with a capacitor;
  an inductor, wherein an input of the inductor is connected to inputs of the first and second high pass filters; and
  a capacitor bank that comprises:
    a first Silicon-Controlled Rectifier (SCR);
    a second SCR;
    two diodes, wherein the first SCR, the second SCR, and the diodes are connected to form a bridge rectifier; and
    a capacitor that is connected to a DC (Direct Current) output of the bridge rectifier,
  wherein the capacitor bank is connected to an output of the inductor such that the inductor and the capacitor bank are in series, and an output of the first high pass filter is connected to a gate of the first SCR and an output of the second high pass filter is connected to a gate of the second SCR.

18. The surge suppressor of claim 17, further comprising a first Silicon Diode for Alternating Current (SIDAC) that is connected in parallel with the capacitor of the first high pass filter and a second SIDAC that is connected in parallel with the capacitor of the second high pass filter.

19. The surge suppressor of claim 17, wherein the capacitor that is connected to the DC output of the bridge rectifier is maintained in a discharged state or a minimally charged state when high frequency voltage surges are not present.

20. A surge suppressor comprising:
  a high impedance high pass filter that comprises a resistor connected in series with a capacitor;
  an inductor, wherein an input of the inductor is connected to an input of the high pass filter; and
  a capacitor bank comprises:
    a Triode for Alternating Current (TRIAC);
      a bridge rectifier comprising four diodes, wherein the TRIAC is connected to an input of the bridge rectifier; and
      a capacitor that is connected to a DC (Direct Current) output of the bridge rectifier,
  wherein the capacitor bank is connected to an output of the inductor such that the inductor and the capacitor bank are in series, and an output of the high pass filter is connected to a gate of the TRIAC.

21. The surge suppressor of claim 20, further comprising a Silicon Diode for Alternating Current (SIDAC) that is connected in parallel with the capacitor of the high pass filter.

22. The surge suppressor of claim 20, wherein the capacitor that is connected to the DC output of the bridge rectifier is maintained in a discharged state or a minimally charged state when high frequency voltage surges are not present.

* * * * *